Figure 1:
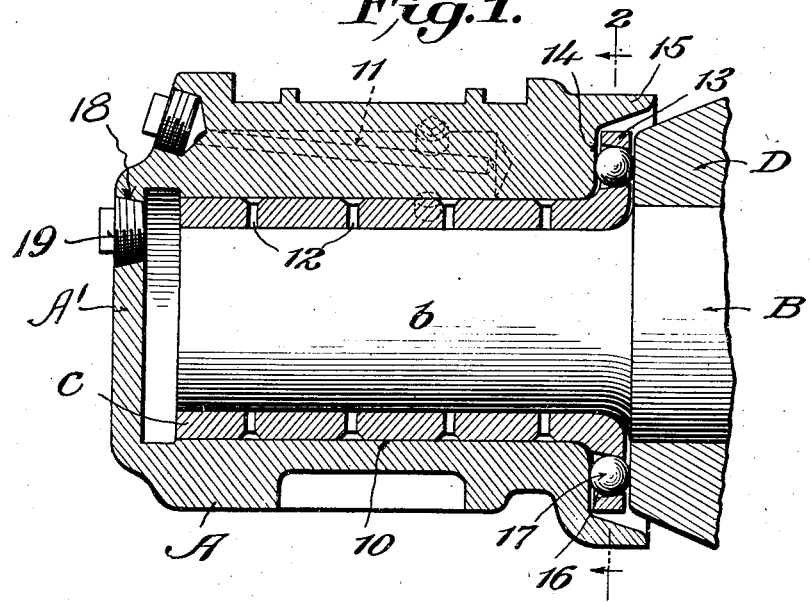

Nov. 14, 1933.  P. W. DIETER  1,935,546

JOURNAL BOX

Filed May 4, 1931

Inventor

Paul W. Dieter,

By D. P. Wolhaupter

Attorney

Patented Nov. 14, 1933

1,935,546

UNITED STATES PATENT OFFICE 1,935,546

JOURNAL BOX

Paul W. Dieter, New York, N. Y.

Application May 4, 1931. Serial No. 534,986

4 Claims. (Cl. 308—40)

This invention relates to journal boxes for railway cars, locomotives and the like, and has particular reference to improvements in journal boxes of the type in which the axle is journaled in a bearing sleeve or bushing rotatably mounted in the axle box, as disclosed for example in my copending application, Serial Number 481,538.

In journal boxes of the type mentioned rotation of the axle within the bearing sleeve or bushing is adapted to effect rotation of the latter within the journal box whereby different portions of the bearing sleeve are adapted to be brought successively into position to receive the weight of the load on the axle, thus to avoid wearing of an axle seat in any one portion of the bearing sleeve and to provide for longevity of the bearing.

Accordingly, an important object of the present invention is to provide a simple reliable means to assure substantially positive rotation of the bearing sleeve within the journal box by rotation of the axle, thus to assure the bringing of different portions of the bearing sleeve successively into load sustaining position during rotation of the axle.

Another important object of the invention is to provide means for the foregoing purpose which is effective to produce a comparatively low angular velocity of the bearing sleeve relative to the angular velocity of the axle, thus to avoid undesirable and unnecessary wear between the bearing sleeve and the journal box.

A further object of the invention is to provide means for the foregoing purposes which substantially eliminates wear on all parts of the structure which primarily cooperate to effect rotation of the bearing sleeve.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the drawing, wherein like characters of reference denote corresponding parts in the different views:—

Figure 2:
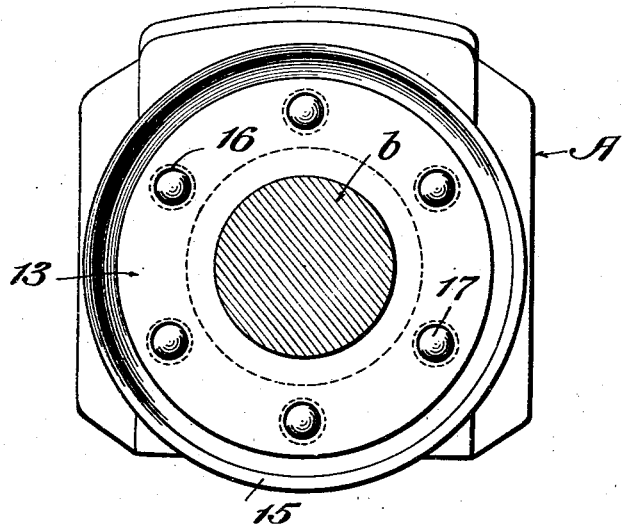

Figure 1 is a central vertical section through a journal box embodying the features of the invention; and Figure 2 is a cross section on the line 2—2 of Fig. 1.

Referring to the drawing in detail, it will be observed that the present journal box or bearing assembly structure is of simple design and embodies few parts, these comprising, essentially, a box or housing designated generally as A, an axle designated as B, and a bearing sleeve or bushing designated as C.

The box or housing A, which may be of any suitable or preferred construction, is formed with an axial bore 10 of circular cross section to receive the bearing sleeve C, and said sleeve likewise is of circular cross section and of a diameter to neatly fit the bore 10 and yet be more or less freely rotatable therein. Within the sleeve C is journaled the end portion b of the axle B, which axle carries a load supporting wheel the hub portion only of which is illustrated and designated as D.

Formed in the top portion of the box or housing A and in communication with the bore 10 is a chamber 11 into which grease, heavy oil or other suitable lubricant is adapted to be introduced in any suitable manner so as to be supplied to the bearing sleeve C rotatably mounted in said bore, while formed through said sleeve at longitudinally and circumferentially spaced points is a number of ducts 12 through which lubricant from the chamber 11 is adapted to pass to the interior of the sleeve to lubricate the axle journal b.

At its inner end the sleeve C is provided with an outwardly directed flange 13 which is disposed between a wall 14 at the inner end of the box or housing A and the adjacent face of the wheel hub D, the said box or housing A preferably being provided with a rearwardly directed protective lip 15 overlying said flange.

Formed through the flange 13 at circumferentially spaced points is an annular series of openings 16 in which are disposed balls 17 which project slightly beyond the inner and the outer faces of said flange for contact, respectively, with the end wall 14 of the box or housing and the adjacent face of the wheel hub D.

Thus, due to the contact of the balls 17 with the wheel hub and the wall 14 of the fixed box or housing A, rotation of the axle and the wheel causes the balls to rotate and roll against the wall 14 with consequent substantially positive rotation of the sleeve C at a comparatively low angular velocity relative to the angular velocity of the axle. Manifestly, therefore, the effective load sustaining portion of the bearing sleeve is constantly shifted during rotation of the axle so long as the wheel hub remains in contact with the balls 17 and the balls remain in contact with the wall 14, and even though such contacts may be only intermittent due to end play of the axle, it nevertheless follows that whenever the axle is shifted to produce said contacts a certain amount of rotation is imparted to the bearing sleeve.

By reason of the provision for rotating the bearing sleeve at a relatively low angular velocity as compared with the angular velocity of the axle, time is allowed, even at high speeds of the axle, for lubricant to pass from the chamber 11 into and through the ducts 12, whereby efficient lubrication of the axle is assured. At the same time, low speed rotation of the sleeve serves to eliminate to a considerable extent wear between the sleeve and the housing while affording all necessary change in the angular disposition of the bearing sleeve to prevent any one portion thereof remaining in a load sustaining position and being subjected to excessive wear. The balls 17 moreover substantially eliminate all wear on the flange portion of the sleeve.

Regarding the flange portion 13 of the sleeve, it will be noted that the ball receiving openings 16 therein are tapered inwardly, i. e., toward the wheel hub and that they are of such diameter at their inner ends as to prevent the balls 17 from passing therethrough. The said openings are preferably tapered in this manner to retain the balls in assembly with the flange and to facilitate assembly and dismantling of the bearing structure.

As will be observed from Figure 1 the housing A is provided in it closed end wall A' with an opening 18 which is closed by a removable plug 19. The purpose of this arrangement is to provide a sight or inspection opening to permit observation of the amount of wear that may occur on the bearing and to also otherwise view the interior condition of the box without removing the entire casing from the axle.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A journal bearing construction comprising a fixed housing, a bearing sleeve rotatably mounted in said housing, an axle journaled in said bearing sleeve, a wheel having a hub on said axle, a flange on said sleeve disposed between a wall of the housing and the hub of the wheel, and rolling members rotatably mounted in the said flange and engaging parts of said housing and said wheel hub, respectively, whereby rotation of the wheel hub effects rotation of the sleeve.

2. A journal bearing construction comprising a fixed housing, a bearing sleeve rotatably mounted in said housing, an axle journaled in said bearing sleeve, a lateral flange on the sleeve disposed between an end wall of the housing and a fixed part of the axle, and rolling members rotatably mounted in said flange and contacting with said wall and said axle part whereby rotation of the axle effects rotation of the sleeve.

3. A journal bearing construction comprising a fixed housing, a bearing sleeve rotatably mounted in said housing, an axle journaled in said bearing sleeve, the sleeve having openings formed therethrough to receive balls, and balls disposed in said openings and engaging parts of said housing and said axle, respectively, whereby rotation of the axle effects rotation of the sleeve, the said openings being of less diameter at one end than said balls to retain the latter within said openings.

4. A journal bearing construction including a housing, a bearing sleeve rotatably mounted in the housing, an axle journalled in said sleeve, said axle having a wheel hub thereon, and means for causing differential angular velocity between the axle and the bearing sleeve, said means comprising a flange rigid with the sleeve and located between the housing and said wheel hub, and motion transmitting elements carried by the flange and adapted to engage with the said wheel hub and the housing.

PAUL W. DIETER.